Feb. 7, 1967  G. H. TRIPP  3,302,527
HYDRAULIC TRANSMISSION
Filed Nov. 23, 1964  7 Sheets-Sheet 1
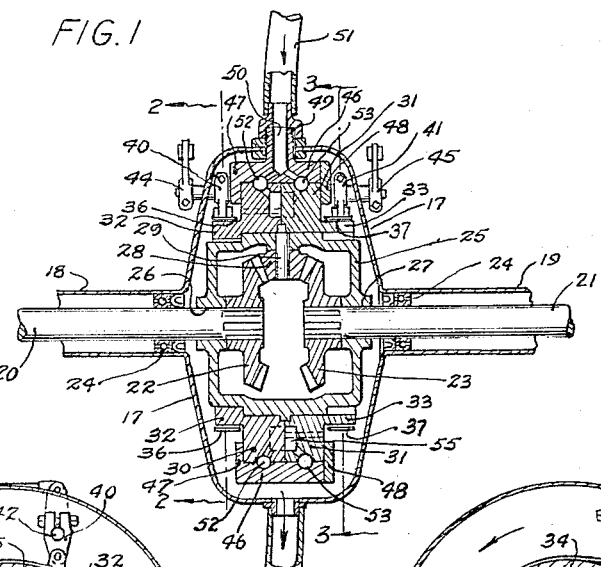
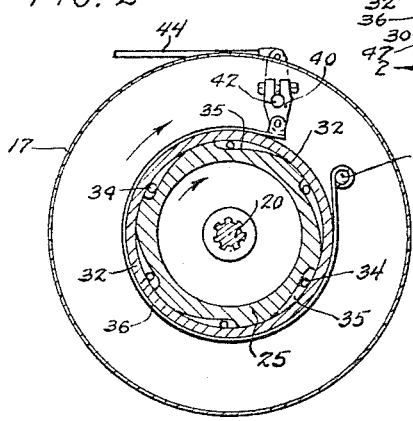
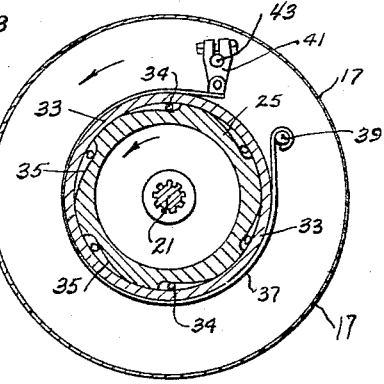
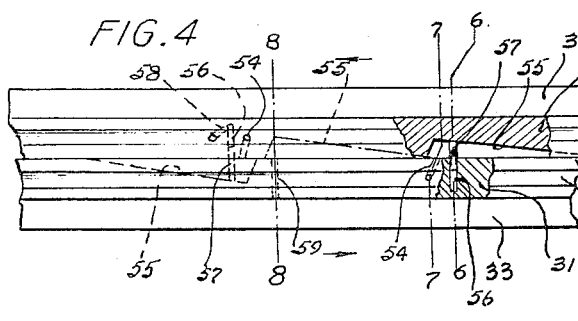
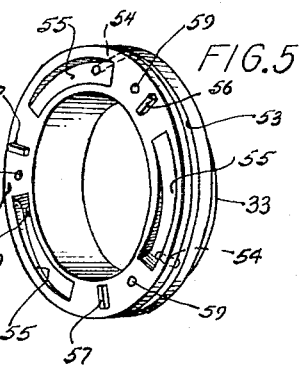
INVENTOR.
GUY H TRIPP
BY
Edward M. Apple
ATTY

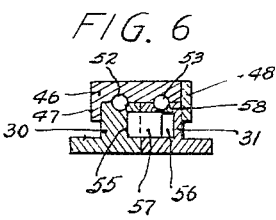
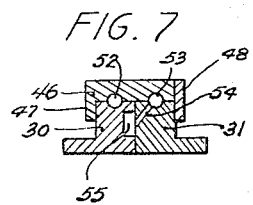
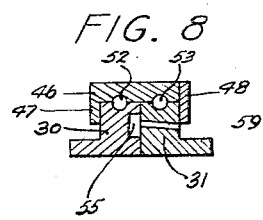
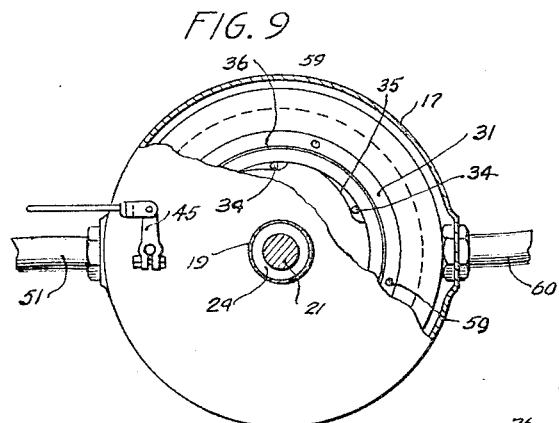
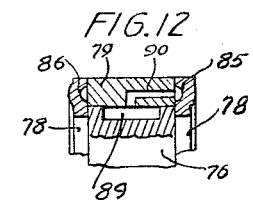
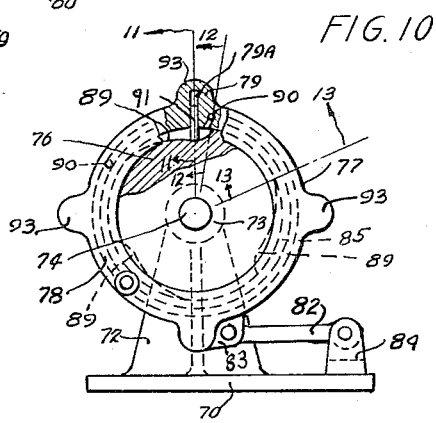
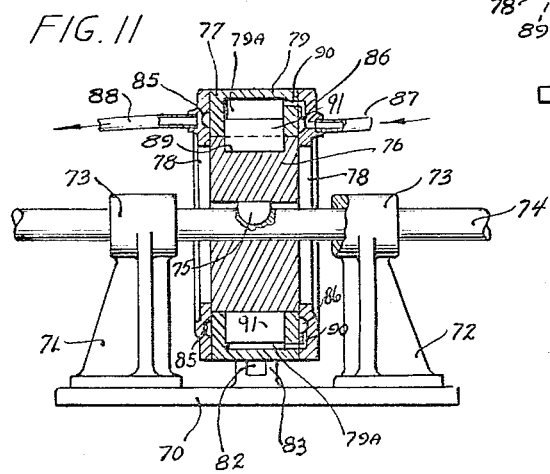
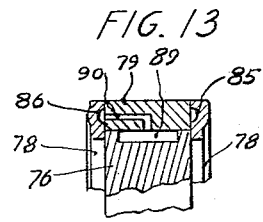

Feb. 7, 1967 G. H. TRIPP 3,302,527
HYDRAULIC TRANSMISSION
Filed Nov. 23, 1964 7 Sheets-Sheet 3

INVENTOR.
BY *GUY H. TRIPP*

Feb. 7, 1967 G. H. TRIPP 3,302,527
HYDRAULIC TRANSMISSION
Filed Nov. 23, 1964 7 Sheets-Sheet 4
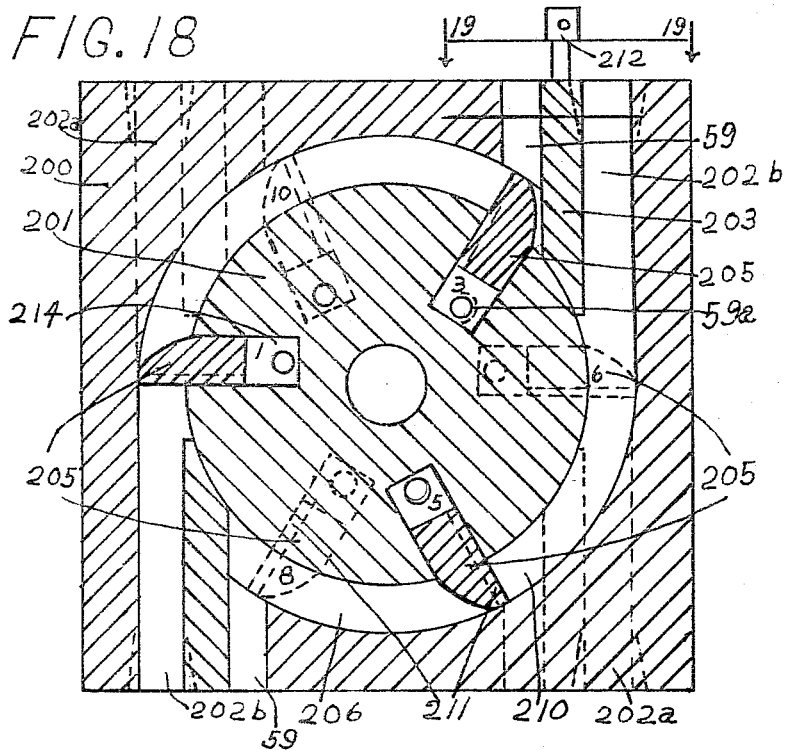
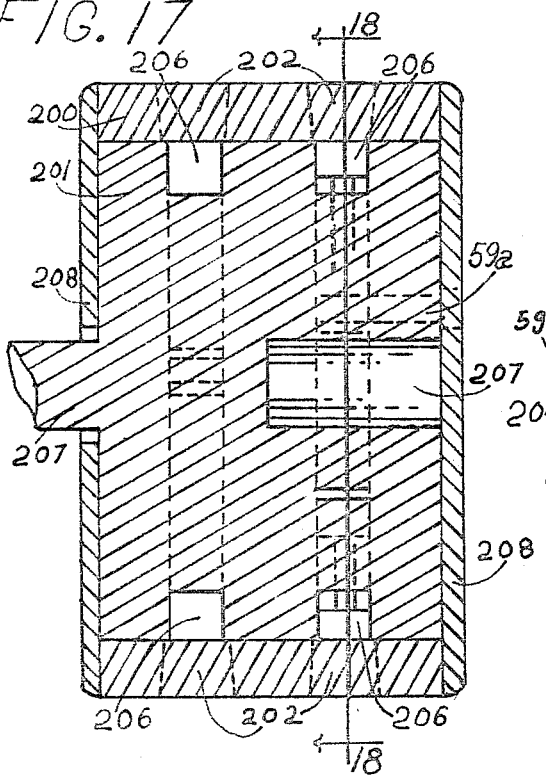
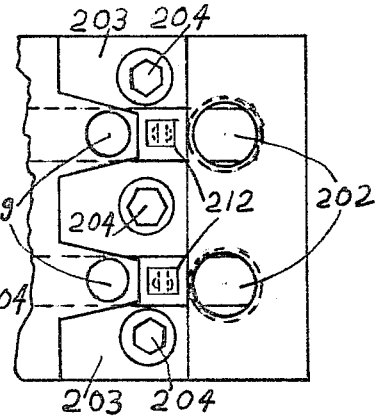
INVENTOR.
BY GUY H. TRIPP

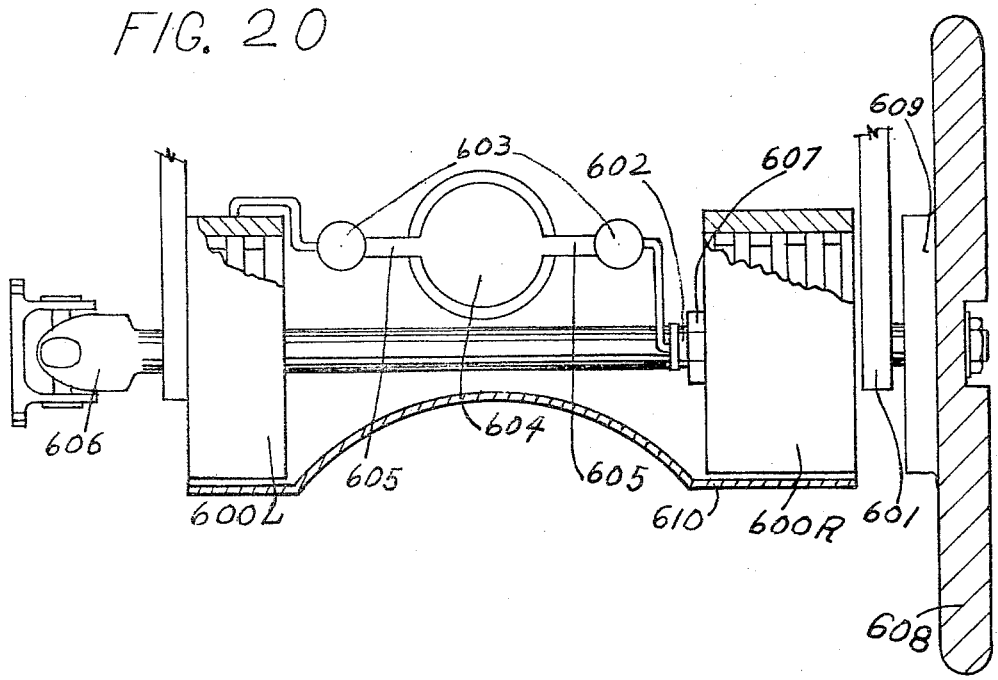

Feb. 7, 1967     G. H. TRIPP     3,302,527
HYDRAULIC TRANSMISSION
Filed Nov. 23, 1964     7 Sheets-Sheet 6

INVENTOR.
Guy H. Tripp
BY

Feb. 7, 1967 G. H. TRIPP 3,302,527
HYDRAULIC TRANSMISSION
Filed Nov. 23, 1964 7 Sheets-Sheet 7
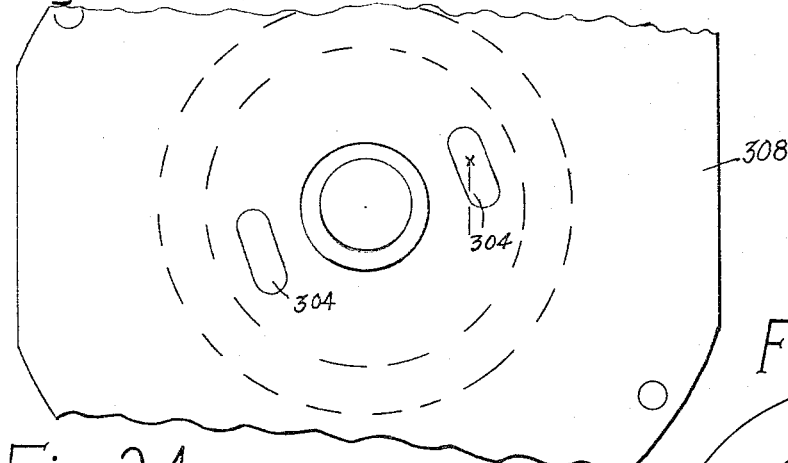
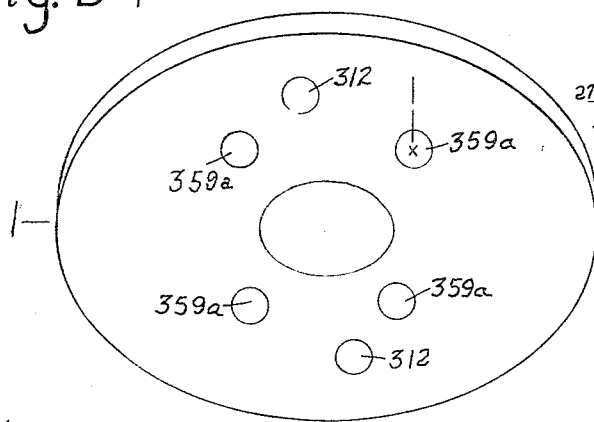
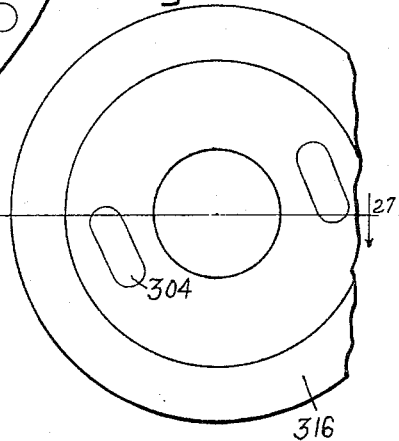
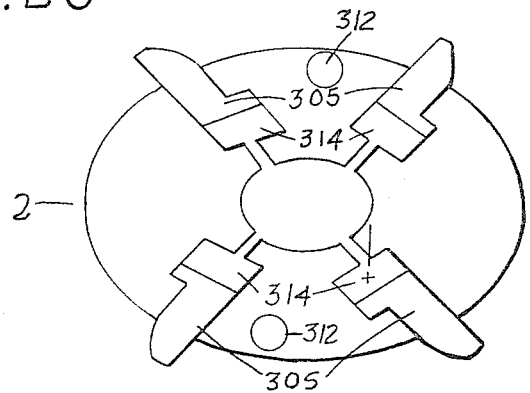
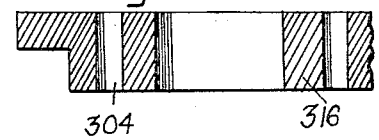
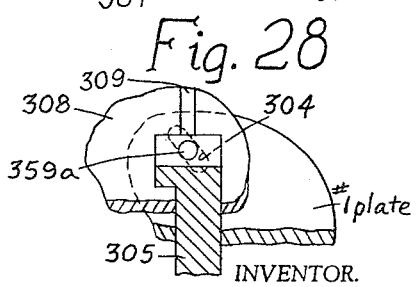
INVENTOR.
Guy H. Tripp
BY

United States Patent Office 3,302,527
Patented Feb. 7, 1967

3,302,527
HYDRAULIC TRANSMISSION
Guy H. Tripp, 209 N. Columbian Road,
Bay City, Mich. 48707
Filed Nov. 23, 1964, Ser. No. 415,848
2 Claims. (Cl. 91—138)

This is a continuation-in-part of application Serial No. 92,434, filed February 17, 1961.

This invention relates to hydraulic rotary mechanisms and has particular reference to a positive action, reversible or irreversible hydraulic drive or transmission for motor driven vehicles or any mobile or stationary device requiring a transmission.

An object of the invention is to provide a fluid mechanism which will replace conventional transmissions and clutches now used in automobiles, tractors, mobile or immobile units and the like.

Another object of the invention is to provide a device of the character indicated which will start to move a load from a dead stop and will provide a slow, smooth positive and continuous force throughout the full range of the motive power to which it is connected.

Another object of the invention is to provide a transmission having a minimum number of moving parts so that it will be silent and trouble free.

Another object of the invention is to provide a hydraulic power transmission device which may be located on the driving axle of a vehicle, whereby to eliminate the necessity of having a clutch, a conventional drive shaft and universal joints.

Another object of the invention is to provide a hydraulic transmission which will permit the full power of the motive force to be used in starting the load without apprecible slippage but with great smoothness and no jerking from a mere move to accelerated motion.

Another object of the invention is to provide a hydraulic transmission which is a simple one in construction, economical to manufacture and one which will be efficient in operation throughout a continued, hard and long use.

Another object of the invention is to provide a hydraulic transmission which is self-braking and will not and can not be affected by water and ice.

Another object of the invention is to provide a hydraulic transmission which has no gears to strip or clutch to slip or give trouble.

Another object of the invention is to provide a hydraulic transmission which will eliminate the high ridge in a car when used in a motor vehicle.

Another object of the invention is to provide a hydraulic transmission which is reversible without the aid of any gears.

Another object of the invention is to provide a hydraulic transmission engine which will operate a clock, a giant-sized machine, locomotive or ship.

According to the present invention there is provided hydraulic rotary mechanism which comprises in combination a stator and rotors in close relation to said stator, spaced pockets or grooves along the periphery or face of said rotors which are elongated in the direction of rotation of said rotors and tapered in depth from end to end, intake passages in said stator in communication with said pockets or grooves and a source of liquid under pressure and exhaust ports spaced from said intake passageways for discharging liquid from said pockets or grooves and a multiplicity of spaced abutments and vanes carried by said rotors and stator and a number of said pockets or grooves and movable with respect thereto, said abutments or vanes being reciprocal in slots and being urged into the pockets or grooves by liquid under pressure action on the ends of the abutments or vanes and which is discharged from said slots by the vanes as they move back into the slots.

To enable the invention to be clearly understood additional embodiments thereof will now be described by way of example with reference to the accompanying drawings, wherein:

FIG. 1 is a vertical section taken through a device embodying the invention, combined with a differential for driving a conventional motor vehicle.

FIG. 2 is a section taken on the line 2—2 of FIG. 1.

FIG. 3 is a section taken on the line 3—3 of FIG. 1.

FIG. 4 is an enlarged fragmentary detail in elevation with parts in section, showing two reversible rotating members comprising the principal parts of the device.

FIG. 5 is a perspective view of one of the rotating elements shown in FIG. 4.

FIG. 6 is a section taken on line 6—6 of FIG. 4.

FIG. 7 is a section taken on line 7—7 of FIG. 4.

FIG. 8 is a section taken on line 8—8 of FIG. 4.

FIG. 9 is a side elevational view of the device shown in FIG. 1 with parts broken away to illustrate a clutch and brake lever mechanism.

FIG. 10 is a vertical section taken through a modified form of the device embodying the invention.

FIG. 11 is a section taken on the line 11—11 of FIG. 10.

FIG. 12 is a section taken on line 12—12 of FIG. 10.

FIG. 13 is a section taken on line 13—13 of FIG. 10.

FIG. 17 is a cross-section of another embodiment.

FIG. 18 is a sectional view taken at 18—18 of FIG. 17.

FIG. 19 is a sectional view taken at top of FIG. 18 to show position of inlets, exhaust and sliding abutment.

FIG. 20 is a view of a new and unique type of gearless, self-braking reversing differential and double braking drive axle.

FIG. 23 shows the location of the ports 304 in the lid cover 308 for exhaust or sealing of the vane chambers 314.

FIG. 24 shows the location of outlets in plate #1 to communicate with the vane chambers 314 in FIG. 25 and exhaust ports 304 shown in FIG. 23.

Figure 21:
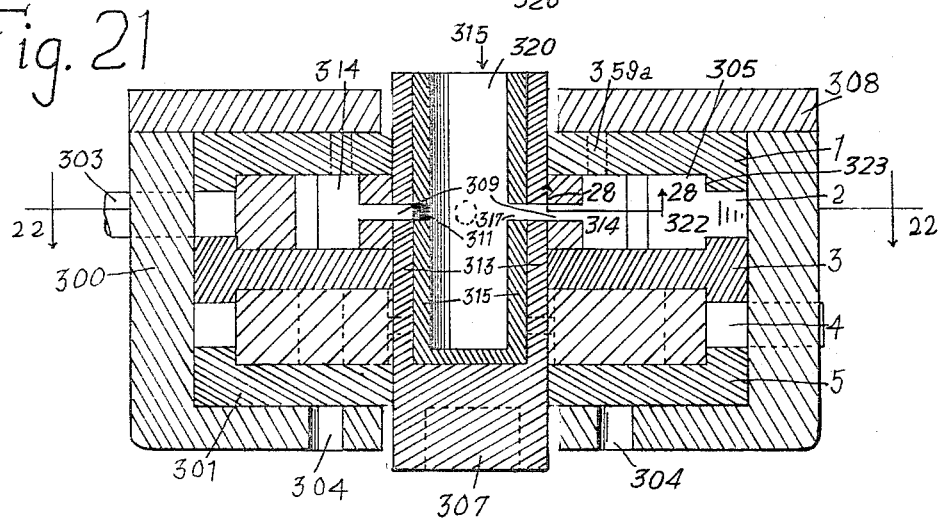
FIG. 21 shows a cross-section of the embodiment.

FIG. 25 shows the position of the multiplicity of vanes and the vane chambers 314 at the inner end of the vanes 305 and how plates 1, 2 and 3 fold down together as in FIG. 21.

FIGS. 26 and 27 show a timing bushing which can replace the two ports in the cover 308 when it is desired to move the ports to change the timing or to replace because of wear.

FIG. 28 is a view along line 28—28 of FIG. 21.

In the embodiment shown in FIG. 1, the reference character 17 indicates the housing in which the working parts of the device are enclosed. The housing 17 has extensions 18 and 19 in which are mounted the axles 29 and 21, to the inner ends of which are respectively secured the differential gears 22 and 23, and at the other ends of which are carried the power wheels (not shown). The axles 20 and 21 are preferably provided with bearing members 24. The differential gears 22 and 23 are enclosed within a casing or housing 25 which is provided with suitable central openings 26 and 27 for receiving the ends of the axles 20 and 21. An idler gear 28 engages the differential gears 22 and 23 and is supported by a bearing 29 carried in the casing 25.

Mounted for rotation about the outer periphery of the casing 25 is a pair of drive rings 30 and 31, each of which has an outwardly directed collar or flange 32 and 33 which overrides a portion of the casing 25. The flanges 32 and 33 each may be connected to the housing 25 by means of over-running clutches as illustrated in FIGS. 2 and 3. The clutch connecting the flange 32 with the housing 25 is engageable in one direction as shown by the arrows in FIG. 2 and the clutch connecting the flange 33 with the housing 25 is engageable in the opposite direction, as shown by the arrows in FIG. 3. The clutches connecting the respective flanges 32 and 33 to the housing 25 consist of balls or rollers 34 which move in slots 35 formed in the outer periphery of the housing 25, as shown in FIGS. 2 and 3. Arranged to engage the outer periphery of the flanges 32 and 33 are brake bands 36 and 37, which bands are secured at one end by means of stops 38 and 39, and which bands are pivotally secured at the other end to brake levers 40 and 41 which are in turn secured, as at 42 and 43, to brake linkage 44 and 45, FIG. 1, through which braking mechanism either of the rings 30 or 31 may be held against rotation.

About the outer periphery of the rings 30 and 31 (FIG. 1) is a stationary annular member 46, which has inwardly extending flanges 47 and 48 arranged to engage the sides of the rings 30 and 31. The stationary annular member 46 has a member 49 which extends through the housing 17. The member 49 has axial passageway 50 which connects through hydraulic tube 51 to a source of hydraulic power, such as a pump (not shown) which may be driven by the vehicle motor. The passageway 50 has two branches connecting to peripheral annuli 52 and 53. Annulus 53 is formed on the inside periphery of the member 46 and the partial annulus 53a is formed on the outer periphery of the ring 31. Annulus 52 is formed in the inside periphery of the member 47 and the partial annulus 52a is formed on the outer periphery of ring 30. 52a and 53a are arranged in the form of partial annuli to admit fluid under pressure into pockets 55 at the proper time and end precisely at the time the power cycle ends and said power cycle being controlled by the four inlets 54 on and in ring 30 substantially the same as is accomplished in FIG. 10 (as shown, the rotor 76 turning in casing 77) except the device in FIGS. 1 to 10 is capable of operating in both forward and reverse motion while in FIG. 10 the device will operate only in clockwise direction. It will be observed in both devices, there is some 80 degrees of driving power as the vanes 57 drop into pockets 55 (FIG. 1) and vanes 91 drop into pockets 89 (FIG. 10). The vanes 57 are urged into position by pressure being fed into the closed end through a small inlet 54, uncovered when the partial annulus 53a is admitting fluid into the pocket 55, the ring 31 having three pockets and in each 120 degree division will allow approximately 80 degrees of driving cycle and approximately 40 degrees of rotation for exhaust, the exhaust being accomplished out the side of the flange 47 and 48 of the annular members 46 and 47 which slot 59a in annular members 46 and 47 is sufficient in length and matches and coacts with the exhaust 59 to exhaust the necessary amount of fluid under pressure to clear the pockets 55 for the next power cycle. The exhaust 59 in ring 30 coincides with the exhaust slot 59a in the side extension of annular members 46 and 47, the opening and closing being effected by the turning of the rings 30 and 31, one turning in one direction and the other in reverse direction whichever ring is free to turn. The exhaust port 59 and slot 59a being arranged to open and close so the pocket 55 will be sealed from exhaust or leak when fluid under pressure is entering through inlet 54 and the power cycle is in operation.

Annuli 52 and 53 are connected with intake ports 54, FIGS. 4 and 5, formed in the rings 30 and 31. The intake ports 54 communicate in turn with large recesses or pockets 55 machined in the side walls of the rings 30 and 31. The pockets 55 are tapered at the ends, as shown in FIGS. 4 and 5, and are arranged in staggered relation between the rings 30 and 31. Each ring 30 and 31 is also provided with somewhat the same or similar slots 56 in each of which reciprocates a vane 57 which is arranged to ride in the pocket 55 of the other ring 30 and 31 whereby to form an abutment in each pocket 55 for the hydraulic fluid to contact and also form an expansible chamber. The fluid under pressure will enter the pockets 55 through the intake ports 54, between the deep ends of the pockets 55 and the vanes 57 and cause the rotation of one of the rings 30 or 31 whichever is not being locked by its brake band against rotation. The rotation of either ring 30 or 31 will cause the rotation of the casing 25 and hence the movement of the gear 28 and the rotation of the gears 22 and 23 to rotate the drive axles 20 and 21.

Vane 57 has hydraulic pressure on one end through a small inlet port 58 in the end of the slot 56 (FIG. 6) which inlet port 58 also communicates with the annulus 53. Fluid is exhausted from the pockets 55 of each ring 30 and 31 through outlet ports 59 (FIGS. 4, 5 and 8) into the interior of the housing 17, from whence it is returned to the pump (not shown) or its supply reservoir through the outlet 60. The flow and pressure of the hydraulic fluid entering the device may be regulated by conventional means which do not constitute a part of this invention.

The brake bands and linkage for respectively holding the rings 30 and 31 against individual rotation may be controlled by a selector arm on the steering wheel or column, as in conventional practice. With such a control one brake band will be locked while the other band is free, and vice versa, so that forward or reverse motion can be selected at will.

In operation the device functions as follows: The direction selector on the steering column is first set so that the traction wheels (not shown) on the axles 20 and 21 will turn in the direction desired. Assume that it is desired to go forward, the setting of the selector (not shown) will actuate the brake linkage 44 and 45 causing the ring 31 to be held against rotation, and freeing the ring 30 so that it can rotate under the influence of the hydraulic fluid which enters tube 51 and the passageways 50 and 52 and hence into the pockets 55 in ring 30. The rotation of the ring 30 causes the rotation of the casing 25 through the clutch elements 32, 34 and 35. The rotation of the casing 25 causes the movement of the member 29 and the gear 28 which in turn causes the rotation of the gears 22 and 23 to drive the axles 20 and 21, yet allow for any differential in speed of the wheels carried thereon. The axles 20 and 21 may be rotated in the opposite direction by reversing the action, that is, by holding the ring 30 against rotation by means of the brake band 36 and causing ring 31 to rotate.

In FIGS. 10–13, I illustrate a modified form of the invention. In this modification I provide a single direction device with no means for reversing it. This form of invention would be suitable for industrial use. In this embodiment the reference character 70 indicated a base having uprights 71 and 72 which supports bearings 73 in which rotates the shaft 74 which may be used for driving industrial machinery. Keyed, as at 75, to the shaft 74 is a rotor 76 which is driven as hereinafter described.

The rotor 76 is housed in a casing 77 to which is attached plate 78 in casing 77 and held together in a fluid-tight manner by any suitable means. The casing 77 is held against rotation by means of the tie rod 82 and the bosses 83 and 84. The plate 78, FIGS. 11 and 12, is provided with annulus 85 and partial annulus 86 which distribute the fluid under pressure which enters at intake 87 and leaves at outlet 88. The rotor 76 is provided with at least three peripheral cut-out sections forming pockets 89 which are shaped as shown in FIG. 10. These pockets 89 in the periphery of the rotor 76 which communicate with the grooves 85 and 86 formed in the plate 78 through passageways or intake 90. There is an uneven number of pockets 89 in rotor 76 and an even number of vanes 91 (four shown) with inlet 90 and exhaust 84 arranged so there can be no exhaust while rotor 76 is being driven. By this arrangement there will be no immobile spot in the 360 degrees of revolution. The peripheral casing 77 has four slots 79a formed in the thick lobes 93 in which vanes 91 (FIG. 10) reciprocate. The deep end of the pockets 89 in front of the vanes 91 comprise work areas for receiving fluid under pressure through the intake ports 90, and in as much as the vanes 91 are fixed against rotation about the axis 74, any increase in fluid pressure in the pockets 89 in front of the vanes 91 will cause the rotor 76 to rotate clockwise (FIG. 10) to drive the shaft 74.

Plate 79 is fastened or secured to rotor 76 and to the shaft 74 and rotor 75 revolves with it and is fluid tight to the housing 77, all of which is enclosed in a fluid tight housing or casing 95. The exhaust timing and sealing of the expansible chambers which are and can be considered the same as 89. As rotor 76 revolves in a clockwise motion, supposing the rotor is at rest and fluid under pressure is admitted into intake 87, it flows into annulus 85 then into partial annulus 86 then through a short passageway and through inlet 90 which is shown in FIG. 10. Vane 91 is forced down by fluid under pressure entering the pocket 89 and as the vane 91 is forced down on the face of pocket 89, fluid enters at inlet 90 forcing rotor 76 to move. This also happens in next clockwise chamber, as it will be noted, the second chamber is half way through its power cycle, while the top chamber is just starting its power cycle. The third chamber has just completed its power cycle and is exhausting. On the inside of plate 79 is a partial annulus 86 in which is arranged slots through which the exhaust is timed through exhaust port 84 then through outlet 88 in plate 79 and then is picked up from over all housing 95 and returned to source of supply. It will be observed that the three pockets 89 in rotor 76 each occupies approximately 80 degrees of arc and the pockets are circumferentially spaced so that each of the three metal sectors 94 between said pockets 89 occupies approximately 40 degrees of arc which gives a wide range of allowance for the exhaust to take place. If we take the third pocket 89 in FIGS. 10 and 13 where exhaust is about to occur, we observe that the metal sector 94 between the pockets 89 is about to cover the inlet ports 90 and thus prevent the fluid under pressure escaping through the exhaust 84. Metal sector 94 also comes in contact with vane 91 to raise it and cut off the pressure supply to the small passageway that snaps the vane 91 into place in pocket 89 and exhausts the fluid allowing vane 91 to recede into the recess at the outer end of stroke in slot 79a. As inlet port 90 is uncovered by metal sector 94, a small slot allows pressure into chamber 79a and snaps vane 91 into the pocket 89, thus forming an expansible chamber at the inlet 90 with the face of the metal sector 94 and the vane 91.

Figure 14:
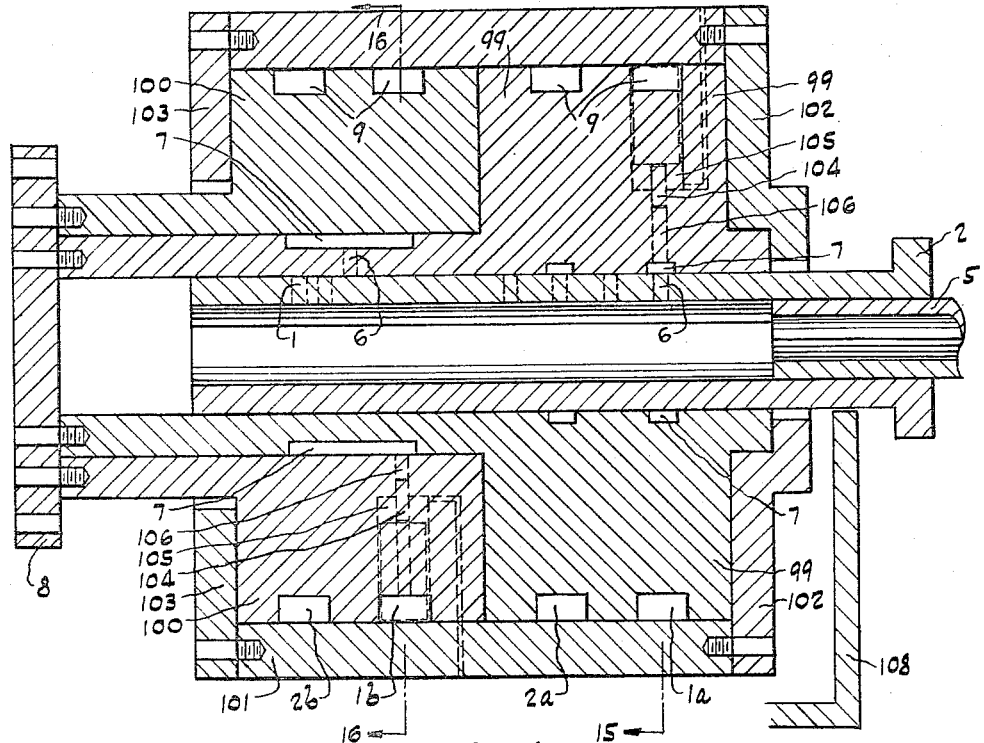
FIG. 14 is a cross-section of a different embodiment.
Figure 16:
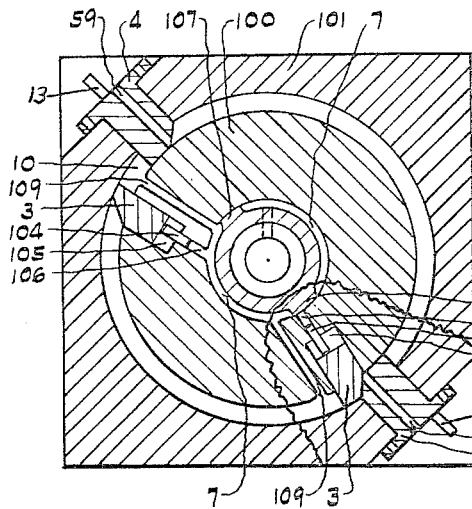
FIG. 16 is a sectional view taken at 16—16 of FIG. 14.
Figure 15:
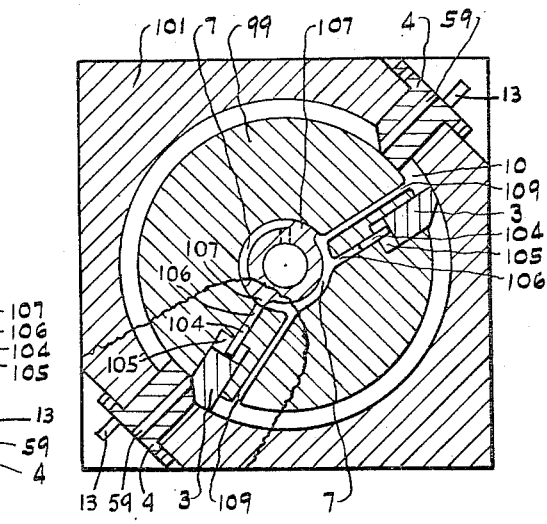
FIG. 15 is a sectional view taken at 15—15 of FIG. 14.

FIGS. 14, 15 and 16 show another embodiment of this invention. FIG. 14 is a cross-section of this embodiment. The parts, ports, passageways, annuli and so on are numbered as follows: 101 is the stator, 99 is the main rotor, 100 is the auxiliary rotor, grooves in rotor 99 are numbered at the bottom of the cross-section in FIG. 14 for the purpose of identification during the description but the grooves as a group are known as 9. 2 is the throttle or control sleeve, 3 is the movable vane in rotors 99 and 100, 4 is the removable abutment secured to stator 101, 59 is the exhaust contained in abutment 4 (FIGS. 15 and 16), 59a is the exhaust from chamber 105, 5 is the movable inlet sleeve to which is connected the pipe to source of supply, 6 is the passageway in rotors 99 and 100 and is in communication with the control sleeve 2 and the annuli 7, 12 are the holes in sleeve 2 which are arranged for timing and control, 7 is the partial annuli, 109 are the passageways from partial annuli 7 to the expansible chambers 10, 10 are the expansible chambers where fluid under pressure moves vane 3 which actuates the rotors 99 and 100, 102 is a plate on the sleeve end, 103 is a plate on the coupling end, 8 is a coupling that locks rotors 99 and 100 to each other, 104 is a pin in passageway 106, 105 is a small chamber at inner end of vane 3, 106 are passageways in rotors 99 and 100 from annuli 7 to chambers 105, 107 are solid sectors between partial annuli 7, 108 is the housing or casing.

Rotor 99 is shown to revolve in clockwise rotation while rotor 100 revolves in a counterclockwise direction. Each rotor 99 and 100 contains two grooves 9 in which is contained vanes 3 and abutments 4. The entire device is contained in a substantial casing or housing 108 which is only partly shown and which prevents oil or fluid, used to operate the device, from escaping and prevents foreign material from entering. On the rear part of rotor 99 is an extension to desired distance for the purpose of holding and allowing rotor 100 to be fitted to and revolve thereon. This device has the great advantage of one rotor, in this case 99, which rotates in a clockwise direction while the rotor 100 will rotate in the opposite direction or counterclockwise, at the same time, provided the rotors are not connected, but when the rotors are connected by a coupling, as shown in FIG. 14, they will not rotate in opposite directions simultaneously but will lock and from a perfect brake when fluid under pressure is forced into both rotors 99 and 100 at the same time.

Inside of rotor 99 is a hollow, slidable, rotatable, cylindrical sleeve 2 which controls the entire device and is the throttle sleeve which contains a multiplicity of holes 1 arranged for timing the fluid under pressure into passageways 6 to the partial annuli 7 and through the passageways 109 connecting with the expansible chamber 10 and thus controlling the entire movement and motion including braking. Fluid under pressure is admitted through inlet 5 which connects with the source of supply and into throttle sleeve 2. By sliding the control sleeve 2 in and out, fluid under pressure is admitted as desired by the operator.

It will be observed that the two abutments 4, shown in FIGS. 15 and 16, are a few degrees from a direct opposition to each other and so arranged that while the exhaust 59 is occurring at one abutment 4, as vane 3 is closely approaching the abutment 4, while the abutment 4 and vane 3 in the next groove is in full driving position until the rotor movement has closed exhaust 59 and is in position for another cycle. Abutment 4 is seen to be slidable with a rod attached so that the slidable abutment 4 can be shifted out the same distance as the depth of the groove in the rotor so that when the rotor is reversed the vane in the same groove will not contact the abutment and stop the rotor. The pin 13 is connected to the actuating lever of the valve (handle not shown) so that the slidable abutments are slid into outer position and held while the rotor is moving in reverse direction. A small pin or flange holds the vanes in rotor while turning idle.

In the chamber 105 at the inner end of vane 3 is a small pin 104 which slides in and out from the center toward vane 3 and rides in a small passageway 106 and pressure from annulus 7 enters this small passageway 106 urging the pin 104 outward thus holding vane 3 in outer position against the inner wall of stator 101. As vane 3 approaches the exhaust position, a small passageway 59a is uncovered by the rotor's own motion and the excessive fluid in the small chamber 105 is exhausted allowing vane 3 to recede in chamber 105 and at the same time fluid is prevented from flowing into chamber 105 by the solid sector 107 between the annuli 7 which cuts off the fluid from running out the exhaust in small chamber 105.

At the end of the power cycle, as vane 3 approaches the abutment 4 in either rotor 99 or 100, the fluid under pressure is cut off by the solid sector 107 in sleeve 2 between the annuli 7 in the rotor wherever the partial annulus 7 is formed and the excessive fluid is exhausted from the expansible chamber 10 through exhaust 59 leaving it ready to receive the incoming pressure when the rotor has passed the exhaust spot and uncovered the inlet port 54. The exhaust fluid drops from outlet 59 into housing 107. The device operates as follows: Suppose we wish to start and run the device in clockwise motion and assume it is at rest, as in FIGS. 14 and 15, we put the sleeve 2 in full inner position which admits fluid through inlet in sleeve 2 and through passageways 1 and 6 into partial annulus 7 and through passageway 109 to expansion chamber 10 which actuates vane 3 causing rotor 99 to turn in a clockwise motion until it returns to abutment 4 and it will then be in exhaust position (shown in cut-away section in a near and somewhat opposite position) and the vane in cut-away section in the next groove will be through the exhaust cycle and just entering its power cycle. The vane in groove 1a will always be driving when the vane in groove 2a will be in its exhaust cycle and vice versa. This continuous rotation results until the fluid under pressure is shut off. The auxiliary rotor 100 operates in the opposite or counterclockwise direction and in the same manner.

In this embodiment, FIGS. 17, 18 and 19, of the invention 200 is the stator, 201 is the rotor in close relation to said stator 200, 202 are the large intake passageways, 203 are abutments right behind the intake passageways 202, 214 are the recesses in which the vanes 205 slide and are pocketed, 205 are the slidable movable vanes of which there are six shown, three in each annular groove 206 in rotor 201, 206 are the annular grooves, two shown, encircling the rotor 201 and in which the vanes 205 ride in alignment therewith, 211 are small slots in the side of each vane 205 which acts as both intake and exhaust, 210 are the expansion chambers, 259 are the exhausts from the expansion chambers 210, 259a are the exhausts for the recesses 214, 207 is the power takeoff (projection on one side and a recess on the other side of the rotor 201), 208 is the side plate sealing the rotor 201 in place, 205 is the vane number (while each vane is numbered for explanation). The vanes in groove 206 at the right and turning in clockwise motion, as shown in FIG. 18, are numbered 1, 3 and 5, while the vanes in the second groove or the one to the left are numbered 6, 8 and 10. In FIG. 18 the intake passages 202 are numbered 202a and 202b to aid in the explanation. 212 is the eye bolt at the end of the slidable baffle 203.

The rotor 201 contains a multiplicity of vanes 205, six shown, three traveling in clockwise direction and three in counterclockwise direction. The vanes 205 are radially slidable and movable while being confined in slots in rotor 201 and are in alignment with annular grooves 206 located in the rotor 201. There can be as many annular grooves, each with sets of vanes, abutments, inlets and outlets, as are needed. Vanes 205 are limited in outward radial movement by the inner surface of the stator 200, the outer peripheral surface of the rotor 201 being sealed by the inner surface of the stator 200 in close relation thereto and almost fluid tight, enough fluid escaping to well lubricate the device.

Fluid from inlets 202a and 202b enters the annular grooves 206 and forces the vanes 205 to rotate in desired direction clockwise or counter clockwise. When the vanes 205, receiving the pressure, reach the end of their power cycles they uncover the exhaust 259, located in the stator 200 in alignment with the annular grooves 206, and the fluid is forced out as the next vane 205 starts its power cycle.

By moving out the abutments not in use prevents the vanes 205 and baffles 203 from coming together and locking the device. The baffles 203 are also positioned in alignment with the annular grooves 206 to prevent the fluid from escaping to the exhaust 259 and to confine the fluid which is forced in annular groove 206 to form an expansion chamber 210 between the abutment 203 and the vane 205, the exhaust being outside the expansion chamber 210. On one side of the abutment 203 and next to it is an inlet 202 and on the opposite side from the inlet 202 is the exhaust port 259, in other words, the abutments divide the short space between the inlet 202 and the exhaust 259. The abutments 203 also divide the volume in the annular space 206 made by the outer surface of the periphery of the rotor 201 and the inner surface of the stator 200.

The exhaust 259, FIG. 18, from the expansible chamber 210 is just behind the abutment 203 and abutment 203 rides in the square slot and the inner end rides in close relation to the rotor 201 in groove 206. It will be noticed that at the inner end of vanes 205 there is a short space beyond the exhaust port 259a which is called a recess chamber 214 and which acts as a cushion and prevents oscillation. As exhaust takes place in the expansion chamber 210, the vane 205 recedes toward the center at an angle and starts exhausting while there is much fluid in the expansion chamber 210 which also cushions at the outer end of the vane 205. The exhaust can be changed as to size and position for the efficient use and performance of this mechanism. It is also within the inventor's right to add larger or smaller grooves in the same rotor in order to increase speed and power, such as a cone-step rotor which would not change the general status of the disclosed device.

In FIG. 17 two plates 208 are shown covering the rotor 201 to keep it from shifting and leaking. In the right hand side of the rotor is shown a recess 207 which can be used for a power take-off in the form of a spline, square and the like, on the opposite or left side is a shaft projection to be used as a driver or if desired a large hole can be made in the construction so it can be mounted on any desired mechanism.

FIG. 19 taken at 19—19 at the top of FIG. 18 shows the baffles 203 are located between the exhaust 259 and inlets 202 and all three are in alignment with the annular grooves 206.

This device is reversible. The slidable abutment 203 is seen to be slidable with a rod attached so that it can be shifted out the same distance as the depth of the groove 206 in the rotor 201 so that when the rotor 201 is reversed the vane 205 in the same groove 206 will not contact the baffle 203 and stop the rotor 201. The eye bolt 212 is connected to the actuating lever of the valve handle (not shown) so that the abutment 203 is slid into outer position and held while the rotor is moving in the opposite direction. A small pin or flange holds the vanes in the rotor while turning idle. An arrangement in the linkage prevents the sliding baffles 203 getting in the way of revolving rotor before the fluid under pressure can be turned into inlets 202. By admitting fluid into all inlets at the same time the rotor is locked and immobilized.

The device operates as follows: Fluid under pressure enters inlets 202b at the same time (both are connected to a source of supply). Suppose vane 1 is just starting on its power cycle, the rotor 201 will move in a clockwise motion and vane 3 will complete exhaust and move into driving position while vane 5 is about half-way through power cycle and is being actuated at the same time that vane 1 is. As vane 1 starts its power cycle, the pressure on vane will be cut off until after it passes through the exhaust cycle. As vane 3 goes through the exhaust cycle, it recedes into recess chamber 214 and in doing so forces the fluid out through exhaust 259a and through a slot in plate 208 and the cycles are repeated until shut off. It will be observed that as vane 205 comes into driving position the fluid under pressure will rush into groove 206 and recess 214 causing vane 205 to be instantly snapped out into drive position and held until it reaches exhaust position. If we desire to turn the rotor in counter clockwise motion, we admit fluid under pressure into inlets 202a and the fluid pressure operates the vanes 6, 8 and 10 in the next groove which functions exactly as vanes 1, 3 and 5 except in opposite or counter clockwise direction.

This embodiment is an extremely efficient device which will deliver the utmost power with the fewest parts in the vane-type transmission as it will rotate in one direction with a single groove motor and three vanes and the inflowing fluid under pressure acts directly in line with the vanes and at the same time there is an expansible chamber which allows this device to start from the slowest move to maximum speed with full power. It will deliver a more even power with the three vanes than it would with two vanes which can be done by placing the vanes off from a direct opposition. There is no loss of power on the inflow and almost none from the exhaust which can be amply large with room and time to allow the necessary time when device is operating at a high rate of speed.

In this embodiment, FIGS. 21–27, I have shown a highly efficient hydraulic transmission which will produce the most power with the least friction and smallest power loss, easy to manufacture, it is reversible and self-braking, weather, ice and the elements will not effect its functioning and it will work under water as well as any where. It is self-lubricating and safe and can be easily controlled, it is inexpensive to operate and will be long lasting when operated with clean hydraulic oil.

The rotor floats in the stator because the rotor is driven from both sides at the same time, the greater number of pairs of inlets and vanes in the circumference of the operating rotor the better equalized pressure and smoother the operation. It is springless, gearless, valveless and reversible. These and other advantages will be apparent as the description proceeds.

Referring to the operation and construction of my invention: 300 is the stator, 301 is the rotor, 302 are the inlets, 303 are the abutments, 304 are the outlets or exhaust ports in the outside plate or cover 308 communicating with the holes in plates #1 and #5 which in turn communicate with the vane chambers 314, 305 are the vanes, 306 are a multiplicity of annular grooves, two shown, formed in the rotor 301, 307 is the power take-off on the partial hollow shaft 313, 308 is the cover, the stator being made with the lower and side cover all in one piece as in FIG. 21, 309 are the inlets from the timing sleeve 315 to the vane chamber 314, 310 are the expansion chambers in the annular grooves 306, 311 are the solid portions in the timing sleeve 315 for shutoff to inlets 309, 312 are the holes in the rotor plates for dowels or screws, 313 is the partial hollow shaft through which fluid passes to vane chambers 314, 314 are the vane chambers, 315 is the timing sleeve, 316 is a timing bushing which can be used if desired, 317 is the inlet through the timing sleeve 315 leading to the inlet 309, 359 are the outlet or exhausts from the expansion chamber 310 in the annular grooves 306, 359a are the exhausts from the vane chambers 314.

In the embodiment shown in FIG. 21 the stator 300 has a central bore in which rotates the rotor 301 in close relation to stator 300. The rotor 301 consists of round plates 1, 2, 3, 4 and 5 of which plates 2 and 4 have an axle-like projection fitting into the counter bore of the other plates 1, 3 and 5 which are larger in diameter than plates 2 and 4. They are held together with dowels 312 or screws in alignment with timing sleeve 315 to prevent any shifting of parts. In fact, the rotor is accurately constructed and like one piece. Slots 322 for the vanes 305 are in plates 2 and 4, the vanes 305 being prevented by the shoulders 323 in the slots from going out more than a good fit at the outer end against the inner surface of the stator 300 as they reciprocate radially in toward the center and out to the inner wall of the stator 300. The annular grooves 306 formed in the periphery of the rotor 301 are sealed by the inner surface of the stator 300. Hydraulic pressure from the timing sleeve 315 radially forces the vanes 305 out into place in the expansion chambers 310 to the inner surface of the stator 300.

Figure 22:
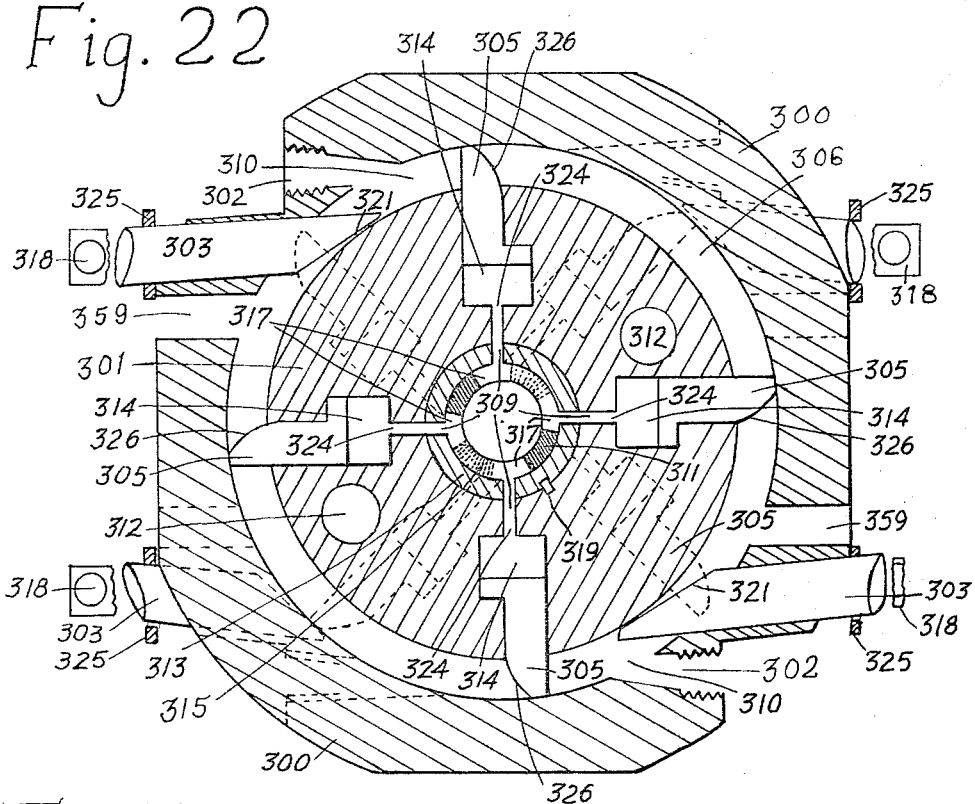
FIG. 22 is a cross-section taken at 22—22 of FIG. 21.

In FIG. 22 abutment 303 has a flat cam face 321 which rides in groove 306, the abutment 303 seals and divides the volume of the groove 306, prevents fluid getting back to exhaust 359 and forces vanes 305 to propel rotor 301 to revolve in clockwise motion or to reverse as shown by vanes 305 in phantom which revolve in the opposite direction. Rotor 301 holds vanes 305 (four vanes shown driving in pairs in expansible chambers) each pair receives fluid at the same time so that the pressure on the rotor 301 is equalized as it bears evenly against the inner wall of the stator 300 and results in smoother operation and greater utility of power. A good example is having both hands on both ends of a tap wrench, you would hardly be able to run the tap in driving the tap with the power coming from only one end of the tap wrench. The expansible chambers 310 are over 90 degrees apart so with the vanes 90 degrees apart or at right angles there is never a dead center. FIG. 22 shows the timing system for the operation of the vanes 305. 319 is a key locking the shaft 313 to the rotor 301. Shaft 313 has passages 309 which communicate with passages 324 to the chamber 314 at the end of the vanes 305 and the fluid entering the sleeve 315 is timed into passages 317, 309 and 324 to chamber 314. 318 are holes in abutment stems for moving abutments 303 in and out. 325 are the collars on abutments 303 to help maintain position and prevent excessive wear and reduce friction on the cam surface 321. 320 is the inlet in the timing sleeve 313 to allow fluid under pressure to enter the device. 326 are the cams on vanes 305 to cooperate with abutment cam 321.

Holes in plate 1, shown in FIG. 24, allow exhaust through slots 304 in the top cover 308 and like holes in the bottom of the stator 300 at 304. As the holes in plate 1 and 5, FIG. 21, of the rotor 301 pass the slots 304 in outside plates 308 exhaust takes place. FIG. 17 shows outside plates 208 which shows substantially the same exhaust arrangement from the vanes. The same action occurs in FIGS. 22 and 18.

The cooperation of plate 308, plate 1 and chamber 314 is shown in FIGURE 28.

Suppose we desire to move the rotor 301 in a clockwise motion; as the vane 305 has receded to its extreme inward position and the exhaust 359a in plate #1 is closed by the position of the rotor 301 in relation to the slots 304 in the top cover 308, fluid under pressure is timed to be admitted into the inlet 309 from the timing sleeve 315 and into the vane chamber 314 back of the vane 305 forcing vane 305 outward against the baffle 303 and to the inner wall of the stator 300. At the same time fluid under pressure from inlet 302 is admitted into annular groove 306 forcing this vane 305 in a clockwise motion and forming an expansion chamber 310. The opposite vane will still be receiving pressure and be in driving position and being forced clockwise to exhaust 359. The exhaust hole 359a in plate 1 communicates with slot 304 in the top cover 308, the exhaust hole 359a being covered during most of the cycle by the inner surface of cover 308. Additional pressure is added into the timing sleeve 315 just before fluid under pressure enters the annular groove 306 so as to overcome any counter pressure. It will be observed that the exhaust 359 is more than 90 degrees from vane position at inner wall of stator 300 after it goes by the abutment 303 until it reaches the exhaust 359 so there is no immobile spot in the motion of the rotor.

The abutments 303 are provided with a knob 318 to pull out and hold out the abutments 303 not in use while the rotor 301 is turning in the opposite direction so that the vanes 305 in the same annular groove 306 will be free and not prevent the movement of the rotor caused by the actuation of the vanes 305 in plate #4 for reverse action. The pairs of abutments 303 in the same annular groove 306 can be moved and held in an outward or inward position by any mechanical means, such means not shown. Threads are shown at the inlets 302 to show how and where the inlet pipe or hose is connected from device to source of supply of fluid under pressure. The vanes 305 are fitted in close relation to the plates 2 and 4, the grooves 306 in these plates being the vane recesses or chambers 314.

FIGS. 23, 24 and 25 show how the timing for exhaust from the vane chambers 314 is accomplished. FIG. 23 shows the cover 308 with the two exhaust openings 304 being longer than their width so that the four holes 359a in plate #1, FIG. 24, are in time as the rotor 301 is turning clockwise during the use of this side of the rotor 301. FIG. 25, plate #2, shows the vane chambers 314 with the vanes 305 in extreme outer position. If you look at FIGS. 23, 24 and 25 and view it like a book in which cover 308 is the top cover tipped up in a vertical position and plate #1 of the rotor is like the leaves of a book and plate #2 is the bottom cover of the book and we shut the book, as shown in FIG. 21, it will be evident how the exhaust timing from the vane chambers 314 is arranged.

FIGS. 26 and 27 show a bushing 316 with exhaust holes 304 like those in cover 308, this bushing 316 is also shown in phantom in cover 308, FIG. 23, if it is desired to move or adjust these exhaust holes 304 for timing purpose, of course, it would be necessary to bore the center hole in cover 308 to receive the bushing 316 so that the bushing 316 would just touch the plate #1 in FIG. 24 to prevent leakage. The flange on the bushing 316 can be clamped in place by any desired means such as screws to prevent its moving when it is adjusted to desired position.

Suppose we are seeing plate #2, FIG. 25, in place in the rotor 301 with plate #1, FIG. 24, on top, the vane chamber marked 314 will be next the outlet hole marked 359a in plate #1. If we transpose plate #2, FIG. 25, to stator 300, FIG. 22, the vane marked 305, FIG. 25, would be receding over the baffle 303.

As the rotor comes into place for the outlet 359a to communicate with the exhaust port 304, the vane 305 comes to the exhaust 359 from the expansion chamber 310 in the annular groove 306 and to the baffle 303 and recedes as it passes the baffle 303. At this time the vane chamber 314 is sealed and the inlet 317 in timing sleeve 315 is open to receive fluid under pressure. The timing sleeve 315 is held stationary in the revolving shaft 313, the timing sleeve 315 being closely fitted thereto. The timing sleeve is solid, as at 311, except as shown at inlet ports 309 where fluid is admitted into the vane chamber 314. The partial hollow shaft 313, in concentric bore in rotor 301, is keyed to the rotor and moves with it.

The foregoing description works the same throughout the entire device whether in counter clockwise motion or clockwise motion. If we take the device in our hands with the bottom toward use, as in FIG. 21, and the top cover 308 away from use, we seen the rotor 301 and vanes 305 in plate #4 turning in clockwise motion, now, turning the device around we see the rotor 301 and vanes 305 in plate #2 moving in clockwise motion.

I claim:

1. A hydraulic motor comprising a stator containing a large central bore and end walls spaced along the axis of said bore and closing the ends thereof, a cylindrical rotor rotatable about the axis of said bore and the outer peripheral surface of said rotor being in close relation to the inner surface of said stator bore and journalling said rotor in said stator, a plurality of annular grooves in said outer peripheral rotor surface, said annular grooves being sealed by the inner surface of said stator, a plurality of inlet passages in alignment and communicating with at least one of said annular grooves and tangent thereto, the other end of said passages communicating with said outer surface of said stator, said inlet passage directing liquid in one direction of rotor rotation, an abutment slidably mounted in said stator adjacent to and displaced from each said inlet contra to said one direction of rotation, each said abutment having a cam surface on the end thereof to divide said groove, and an outlet passage communicating with said groove adjacent to and displaced from each said abutment contra to said direction of rotation, each said outlet communicating with the outer surface of said stator, and inlet passages, abutments and outlet passages for at least another of said annular grooves wherein said abutments and passages are arranged for the opposite direction of rotation, a plurality of slots in the radially inner surface of each said groove extending into said rotor, a vane in each of said slots, each of said vanes extending radially outward of said slot and sealingly dividing said groove and slidingly engaging said stator bore, cam surfaces on the radially outer end of each of said vanes arranged to cooperate with the cam surfaces of said abutments to depress the vanes into their slots to pass said abutments, an output shaft fixed to said rotor and extending through said stator end walls, said output shaft being hollow from one end at least through said rotor, individual passages through said rotor and output shaft communicating each slot beneath the vane with said hollow portion of said shaft, an adjustable, hollow timing sleeve in said hollow portion of said output shaft having openings to communicate periodically with said individual passages, fluid supply means to said hollow portion of said timing sleeve, and further individual passages communicating with said slots beneath the vanes and extending to the adjacent stator end wall, and openings in said stator end wall arranged to communicate periodically with said further individual passages, said timing sleeve openings and said end wall openings being arranged to permit said vanes to be depressed in their slots when passing said abutments and to be extended at other times, and means to raise the abutments out of the grooves for rotation in said one direction when the rotor is to rotate in the opposite direction and vice versa.

2. A hydraulic motor as set forth in claim 1 containing means to drive said vanes in pairs, said pairs being diametrically opposite vanes.

References Cited by the Examiner

UNITED STATES PATENTS

| 592,284 | 10/1897 | Ferguson _____ 91—109 X |
| 597,872 | 1/1898 | Baugh _____ 91—138 |
| 674,258 | 5/1901 | Croston. |
| 776,882 | 12/1904 | Augustine _____ 91—138 |
| 779,400 | 1/1905 | Estby _____ 91—140 |
| 793,985 | 4/1905 | Brugere. |
| 1,010,407 | 12/1911 | Allan _____ 91—109 X |
| 1,378,855 | 5/1921 | Gollings _____ 91—72 |

FOREIGN PATENTS

| 66,183 | 3/1913 | Switzerland. |

MARK NEWMAN, *Primary Examiner.*

KARL J. ALBRECHT, SAMUEL LEVINE, *Examiners.*

F. T. SADLER, *Assistant Examiner.*